United States Patent Office 3,403,005
Patented Sept. 24, 1968

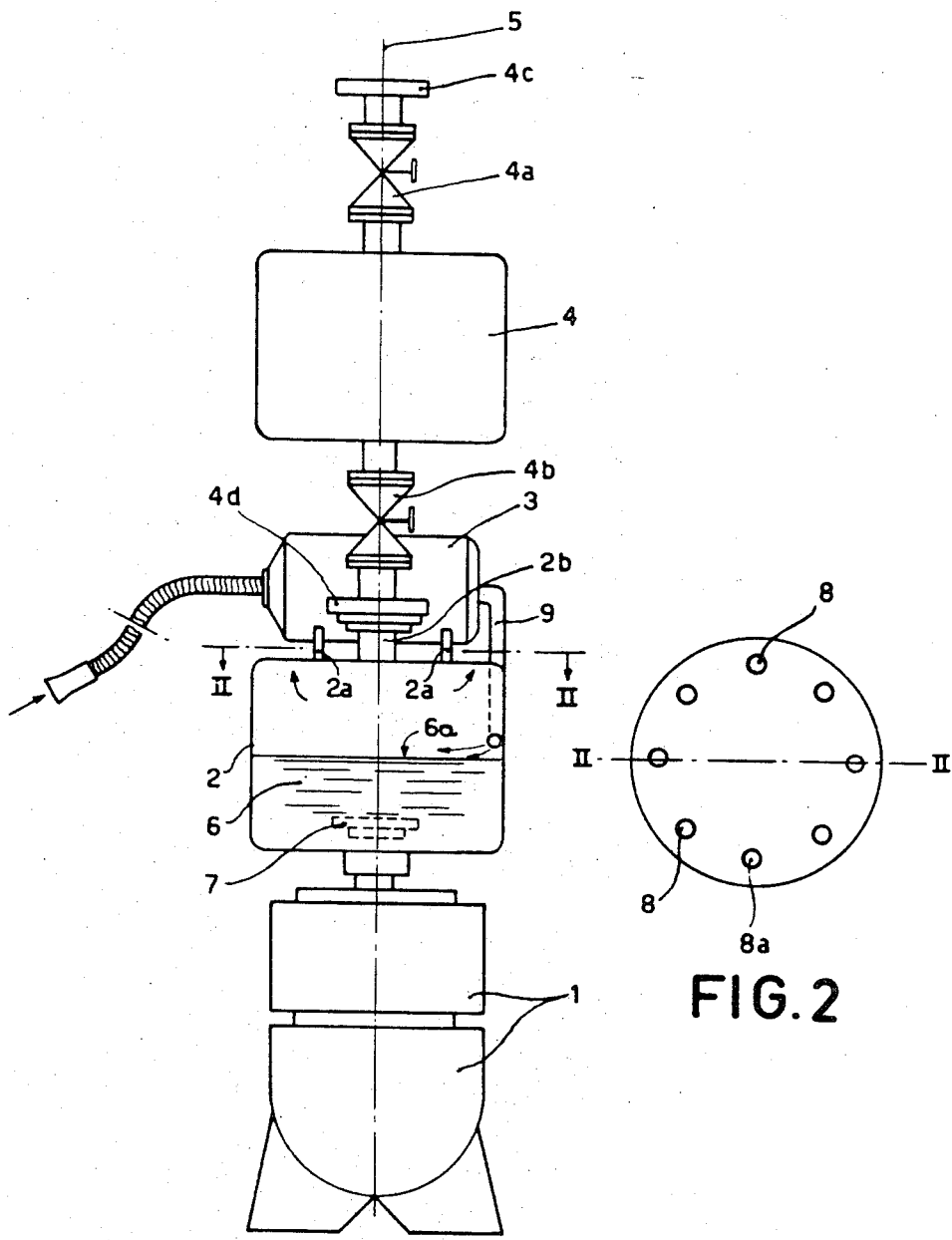

3,403,005
APPARATUS FOR THE PURIFICATION OF AN ENCLOSED INERT ATMOSPHERE
Marcel L. Portal, Brebbia, Italy, assignor to European Atomic Energy Community—Euratom, Brussels, Belgium
Filed Apr. 30, 1965, Ser. No. 452,124
Claims priority, application Belgium, May 11, 1964, 520,136, Patent 647,721
7 Claims. (Cl. 23—252)

In chemical and metallurgical laboratories solid or liquid substances frequently have to be handled in an inert atmosphere, such as argon, for example, which is kept in sealed chambers to prevent any access of oxygen or moisture.

Despite all precautions, oxygen and water vapour originating from various places are always found in such chambers. These impurities may originate from the following sources:

Chemical reactions in the said chambers with the evolution of $O_2$ and/or $H_2O$, Inert gas originating from commercial cylinders, and hence not always pure, and The geometric shape of such chambers does not always permit complete evacuation of oxygen and moisture.

Thus the atmosphere of such chambers must occasionally be purified, to remove oxygen and water vapour.

Purification installations for this purpose are known which are fixed outside the chamber. For purification purposes they are connected to the chamber for purification and the atmosphere of the chamber is passed over a strong reagent, for example Na or liquid NaK, which extracts the oxygen and moisture by oxidation.

The efficacy of the reagent depends greatly on its cleanness and the magnitude of the reagent surface exposed to atmosphere. A fixed installation is known in which the conditions for good efficiency are excellent. This installation purifies the atmosphere by projecting a shower of reagent through the chamber. Although the known installations are relatively satisfactory as regards purification they are bulky and awkward to handle.

The main object of the invention is to provide a purification apparatus which is more suitable and satisfactory for laboratory requirements. More particularly apparatus which is easy to handle, simple and cheap. It may also be arranged for location inside the sealed chamber.

The invention provides portable apparatus for the purification of an inert atmosphere by removal of oxygen or water vapour by reaction with a liquid metal reagent and comprising, as three movable and separable units, a purification chamber to contain the reagent in the form of a bath and having inlet and outlet openings for the gas to be purified and an inlet for reagent, a magnetic agitator to agitate the reagent bath and means for passing the gas through the purification chamber.

The means for passing the gas through the purification chamber may comprise a suction extractor which feeds the gas into the purification chamber.

In a preferred embodiment, the agitator, the purification chamber and the suction extractor are mounted successively along an axis of symmetry, the radial dimensions of one unit not being greater than those of the other units. This configuration is particularly suitable for passage through a lock, a hatch, or other confined opening.

The conduit between the extractor outlet and the purification chamber preferably leads into the latter above the bath level. The gas for purification then sweeps over the bath surface without entering the same. This reduces the possibility of undesirable reactions of a reagent mixed directly with particles of moisture. The conduit is so fitted as to be within the limits of the periphery of the system.

The above-mentioned features give the apparatus according to the invention various advantages, such as:

Ease of handling, simplicity and mobility of the apparatus.

Ready movement and passage of the apparatus, for example, through the constricted portions of a chamber.

Localised collection of the atmosphere at the place where the impurities form.

Purification can be carried out without any inconvenience for the entire period of the experiment.

Auxiliary servicing of very large chambers having a fixed purification installation.

A specific apparatus according to the invention will now be described by way of example, with reference to the accompanying drawing, wherein:

FIGURE 1 is a diagrammatic side view of the apparatus, and

FIGURE 2 is a cross-section of the apparatus of FIGURE 1 on the line II—II in FIGURE 1.

The four main units of the apparatus comprise a magnetic agitator 1 together with a heating device, a purification chamber 2, an electric suction extractor 3 and a reagent tank 4. All these units are disposed along the axis of substantial symmetry 5. The lateral dimensions of the units 1, 2 and 4 are equal. The extractor 3 is held by the arms 2a of the purification chamber 2 exactly within the limits of the top wall of the chamber. The agitator and extractor are of a type generally used in laboratories. The agitator has a ferromagnetic rotor covered with an insulating material of conventional type, and the extractor is of medium power.

The purification chamber 2 contains a bath 6 of a few litres of NaK. The magnetic mass 7 of the agitator is disposed at the bottom of the chamber. As will be clearer from FIGURE 2—a top plan view of the top wall of the chamber on the line II—II—the top wall of the chamber has a series of apertures 8, which with the exception of the aperture 8a, act as outlets for the purified gas. The aperture 8a is the opening of the connecting tube 2b for connection to the supply tank 4.

The outlet of the extractor 3 is connected to the purification chamber via a tube 9 of the rapid fastening type. This tube leads into the chamber 2 immediately above the level 6a of the bath and is housed in a sheath inside the chamber 2 so as not to exceed the radial dimensions of the system. The extractor intake may be connected to a flexible tube. At top and bottom the supply tank 4 is provided with valves 4a, 4b and connections 4c, 4d, for its rapid installation and removal. The connections are formed by three parts (male, female and nut) with silicone gaskets for 150° C. They are welded to the valves. The valves are similarly secured to the supply tank 4.

The purification chamber 2 rests freely on the body of the magnetic agitator 1, i.e., the top of the latter has a magnetic plate with a shoulder into which the chamber fits. The reagent bath in the purification chamber and the reagent in the supply tank are electrically heated within the required period by a heating element disposed on the outside of the chambers.

The units in contact with the reagent are of non-magnetic stainless steel.

The principle of operation of the new apparatus is based on oxidation of the surface of the NaK reagent. This surface is constantly renewed by the action of the magnetic agitator, so that the affinity of the reagent with respect to oxygen and moisture is at a maximum. The agitator produces a radial current of the reagent from the centre to the periphery. The oxidised parts are thus continually propelled from the centre to the edges of the bath, where they accumulate. The atmosphere for purification is supplied via the conduit 9 and sweeps the surface of the bath without penetrating into the latter. The self-purification of the bath is therefore not disturbed by the gas. This does not mean that gas cannot be bubbled through the bath if required. The operations which are required for operating the apparatus are as follows. The purification chamber 2 is filled with the required quantity of reagent from the supply tank coupled thereto. The agitator is started and the emptying valve 4b of the tank is opened, to facilitate the descent of he reagent the valve 4c may be opened slightly. When the required amount of reagent is in the chamber 2 the valve 4b is closed and the two units may then be separated. The extractor is then sarted up and purification of the atmosphere begins.

The efficiency of the apparatus according to the invention has been repeatedly proved. In the case of purification of the atmosphere of a 0.800 cubic metre glove box, for example, the amount of $O_2$ initially present was 350 p.p.m. The relative humidity of the atmosphere was 20%. The amount of sodium used in the purification chamber was 3 litres, and the purification time was 2 hours. After one hour's purification, the oxygen and $H_2O$ contents were respectively 150 p.p.m. and 0%. After 2 hours the oxygen content was only 10 p.p.m. Extension of the purification time to 6 hours brought the content to 4 p.p.m. This result may be regarded as excellent.

In places where the atmosphere is subject to radioactive contamination, the apparatus can be fitted to the inner wall of the chamber and thus operate in a fixed position, the tank remaining on the outside and out of range of the contamination. The purification apparatus may be provided with rollers or handles for ease of transport. In the embodiment shown in FIGURE 1 the agitator is provided with rigid legs 9. The height of the apparatus shown in FIGURE 1 is about 80 cm., and its diameter is 18 cm. The extractor output was 400 litres per hour.

There are numerous practical embodiments of the apparatus as regards shape, configuration and interconnection between the units. Instead of the conduit 9 between the extractor and the purification chamber discharge directly above the reagent bath level, it may be connected to an aperture in the top wall of the chamber.

I claim:

1. A portable apparatus for the purification of an inert atmosphere enclosed in a gas tight container by the removal of oxygen and water vapor by reaction with a liquid metal reagent comprising; a unitary assembly of three movable and separable units including, a purification chamber having orifices for the escape of the purified gas and containing the reagent in the form of a bath, a magnetic agitator for stirring the reagent bath, and a suction extractor feeding the atmosphere to be purified into the purification chamber, said purification chamber including an inlet for said reagent.

2. A portable apparatus as defined in claim 1, wherein the three movable and separable units of the unitary assembly are positioned symmetrically about a common axis.

3. A portable apparatus as defined in claim 2, wherein the radial dimensions of the three movable and separable units of the unitary assembly are substantially the same.

4. A portable apparatus as defined in claim 3, wherein the purification chamber is mounted on top of the agitator and the suction extractor is mounted on top of the purification chamber.

5. A portable apparatus as defined in claim 4 including, an outlet in said extractor, an inlet in said purification chamber immediately above the level of the reagent bath, and a conduit connecting said extractor outlet and said purification chamber inlet.

6. A portable apparatus as defined in claim 5, wherein said conduit is mounted along the purification chamber in such a manner as not to protrude beyond the periphery thereof.

7. A portable apparatus as defined in claim 1 including, a reagent supply tank with a valve controlled readily detachable connection to the reagent inlet of the purification chamber.

References Cited
UNITED STATES PATENTS

| | | | |
|---|---|---|---|
| 1,769,025 | 7/1930 | Hendry | 23—2 |
| 2,495,895 | 1/1950 | Hervert | 259—2 |

OTHER REFERENCES

Cole-Parmer Instrument and Equipment Co., page 6, Developments, January 1956, publication of Cole-Parmer Co., 224 W. Illinois St., Chicago, Ill.

JAMES H. TAYMAN, JR., *Primary Examiner.*